United States Patent
Kim

(10) Patent No.: US 10,273,882 B2
(45) Date of Patent: Apr. 30, 2019

(54) GAS TURBINE SYSTEM USING SUPPLEMENTAL COMPRESSED AIR TO COOL

(71) Applicant: HANWHA AEROSPACE CO., LTD., Changwon-si (KR)

(72) Inventor: Myeong Hyo Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 528 days.

(21) Appl. No.: 14/902,729

(22) PCT Filed: Jun. 25, 2014

(86) PCT No.: PCT/KR2014/005616
§ 371 (c)(1),
(2) Date: Jan. 21, 2016

(87) PCT Pub. No.: WO2015/002402
PCT Pub. Date: Jan. 8, 2015

(65) Prior Publication Data
US 2016/0169106 A1    Jun. 16, 2016

(30) Foreign Application Priority Data

Jul. 4, 2013 (KR) .................. 10-2013-0078573
Apr. 16, 2014 (KR) .................. 10-2014-0045493

(51) Int. Cl.
*F02C 6/16* (2006.01)
*F02C 3/04* (2006.01)
(Continued)

(52) U.S. Cl.
CPC ............... *F02C 7/10* (2013.01); *F02C 3/04* (2013.01); *F02C 6/18* (2013.01); *F02C 7/32* (2013.01);
(Continued)

(58) Field of Classification Search
CPC ...... F02C 7/10; F02C 7/32; F02C 3/04; F02C 6/16; F05D 2260/20; F05D 2220/32
(Continued)

(56) References Cited

U.S. PATENT DOCUMENTS 2,749,025 A * 6/1956 Stalker .............. F04D 27/0215
                                                415/144
3,151,250 A * 9/1964 Carlson ................... F02C 6/14
                                                290/30 R
(Continued)

FOREIGN PATENT DOCUMENTS

JP    11-336508 A    12/1999
JP    2001-303971 A  10/2001
(Continued)

OTHER PUBLICATIONS

Search Report dated Sep. 26, 2014, issued by the International Searching Authority in counterpart International Application No. PCT/KR2014/005616 (PCT/ISA/210).
(Continued)

*Primary Examiner* — Todd E Manahan
*Assistant Examiner* — Eric Linderman
(74) *Attorney, Agent, or Firm* — Sughrue Mion, PLLC

(57) ABSTRACT

There is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion; and a compressed air supplier providing second compressed air to which the heat recovered by the heat recoverer is transferred, wherein at least a portion of the
(Continued)

second compressed air to which the heat has been transferred is supplied to at least one of the combustor and the turbine portion.

15 Claims, 5 Drawing Sheets

(51) Int. Cl.
    *F02C 7/10*     (2006.01)
    *F02C 7/32*     (2006.01)
    *F02C 6/18*     (2006.01)

(52) U.S. Cl.
    CPC ............ *F02C 6/16* (2013.01); *F05D 2220/32* (2013.01); *F05D 2260/20* (2013.01); *Y02E 20/16* (2013.01)

(58) Field of Classification Search
    USPC ....................................................... 60/39.182
    See application file for complete search history.

(56) References Cited

U.S. PATENT DOCUMENTS

| | | | | |
|---|---|---|---|---|
| 3,631,673 | A * | 1/1972 | Charrier | F02C 6/14 290/52 |
| 4,032,793 | A * | 6/1977 | Uram | F01D 17/24 290/2 |
| 4,550,562 | A * | 11/1985 | Rice | F01K 23/10 60/728 |
| 5,632,143 | A * | 5/1997 | Fisher | F01K 23/10 60/39.181 |
| 5,934,063 | A * | 8/1999 | Nakhamkin | F02C 6/06 60/727 |
| 6,038,849 | A * | 3/2000 | Nakhamkin | F02C 6/06 60/726 |
| 6,098,395 | A | 8/2000 | North | |
| 6,499,303 | B1 * | 12/2002 | Polukort | F01K 23/10 60/39.182 |
| 6,584,779 | B2 | 7/2003 | Priestley | |
| 6,745,569 | B2 * | 6/2004 | Gerdes | F02C 6/16 60/39.183 |
| 6,748,733 | B2 * | 6/2004 | Tamaro | F01K 23/101 60/39.182 |
| 7,114,915 | B2 * | 10/2006 | Uematsu | F01D 5/084 415/115 |
| 7,146,795 | B2 * | 12/2006 | Pelini | F01K 21/047 60/39.55 |
| 7,389,644 | B1 * | 6/2008 | Nakhamkin | F02C 6/16 60/39.183 |
| 7,434,402 | B2 * | 10/2008 | Paprotna | F01D 11/24 415/115 |
| 7,441,410 | B2 * | 10/2008 | Kishibe | F01K 21/047 29/889.2 |
| 7,716,930 | B2 * | 5/2010 | Chillar | F01D 25/12 60/39.182 |
| 7,961,835 | B2 * | 6/2011 | Keller | F01K 3/181 376/317 |
| 7,971,424 | B2 * | 7/2011 | Masada | F01K 9/003 60/39.182 |
| 8,613,186 | B2 * | 12/2013 | Koganezawa | F02C 3/10 261/115 |
| 9,551,279 | B2 * | 1/2017 | Page | F02C 6/16 |
| 9,752,501 | B2 * | 9/2017 | Kraft | H02K 7/1823 |
| 2003/0033812 | A1 * | 2/2003 | Gerdes | F02C 6/16 60/772 |
| 2003/0033814 | A1 * | 2/2003 | Bakran | F02C 6/16 60/778 |
| 2006/0005527 | A1 * | 1/2006 | Kopko | F02C 3/36 60/39.511 |
| 2006/0254280 | A1 * | 11/2006 | Briesch | F01D 19/00 60/772 |
| 2007/0139193 | A1 * | 6/2007 | Arik | F01D 17/02 340/539.26 |
| 2008/0072577 | A1 * | 3/2008 | Taylor | F01D 25/32 60/295 |
| 2008/0178602 | A1 * | 7/2008 | Nakhamkin | F02C 6/16 60/774 |
| 2008/0272598 | A1 | 11/2008 | Nakhamkin | |
| 2009/0100835 | A1 * | 4/2009 | Nakhamkin | F01D 15/10 60/659 |
| 2009/0145103 | A1 * | 6/2009 | Nakhamkin | F02C 6/18 60/39.182 |
| 2009/0178384 | A1 * | 7/2009 | Nakhamkin | F02C 6/16 60/39.183 |
| 2009/0260342 | A1 | 10/2009 | Ishiguro et al. | |
| 2011/0094236 | A1 * | 4/2011 | Finkenrath | F02C 6/16 60/772 |
| 2012/0000204 | A1 * | 1/2012 | Kesseli | F02C 3/107 60/778 |
| 2012/0055166 | A1 * | 3/2012 | John | F01K 23/10 60/772 |
| 2012/0096869 | A1 * | 4/2012 | Kesseli | F02C 3/20 60/772 |
| 2013/0192216 | A1 * | 8/2013 | Berlin, Jr. | F02C 6/16 60/327 |
| 2014/0096523 | A1 * | 4/2014 | Coney | F01K 23/10 60/650 |
| 2014/0137563 | A1 * | 5/2014 | Kerth | F02C 6/16 60/772 |
| 2017/0107903 | A1 * | 4/2017 | Page | F02C 3/30 |

FOREIGN PATENT DOCUMENTS

| | | |
|---|---|---|
| JP | 2002-004814 A | 1/2002 |
| JP | 2011-137470 A | 7/2011 |
| JP | 2012-180774 A | 9/2012 |
| KR | 10-2000-0005425 A | 1/2000 |
| KR | 10-2002-0030435 A | 4/2002 |
| WO | 2012/147792 A1 | 11/2012 |

OTHER PUBLICATIONS

Written Opinion dated Sep. 26, 2014, issued by the International Searching Authority in counterpart International Application No. PCT/KR2014/005616 (PCT/ISA/220 and PCT/ISA/237).

\* cited by examiner

[Fig. 1]
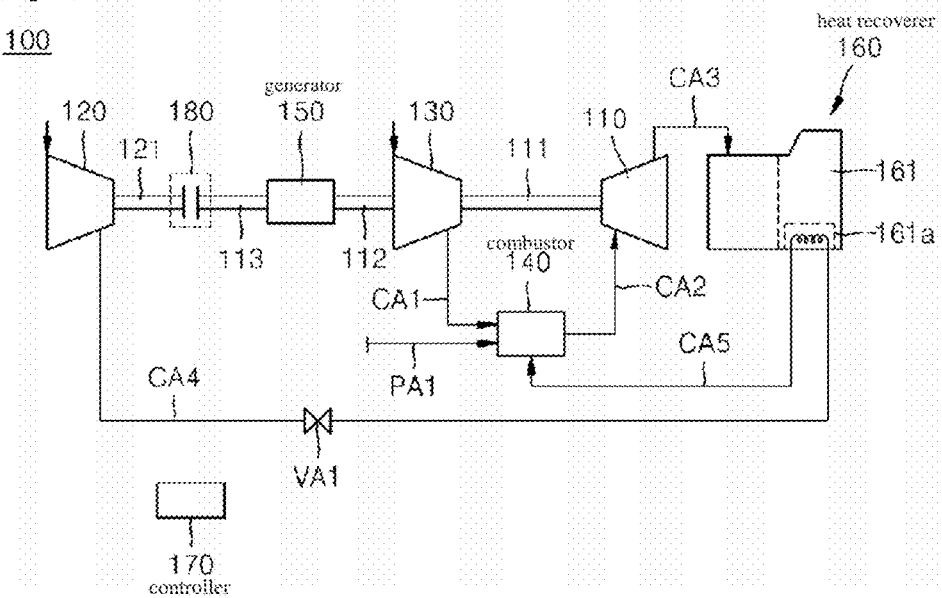
[Fig. 2]
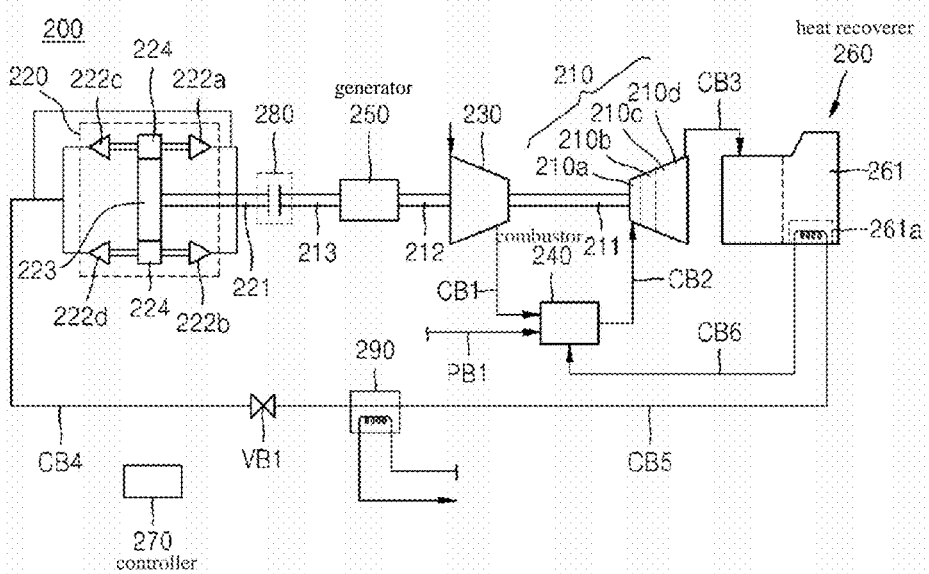

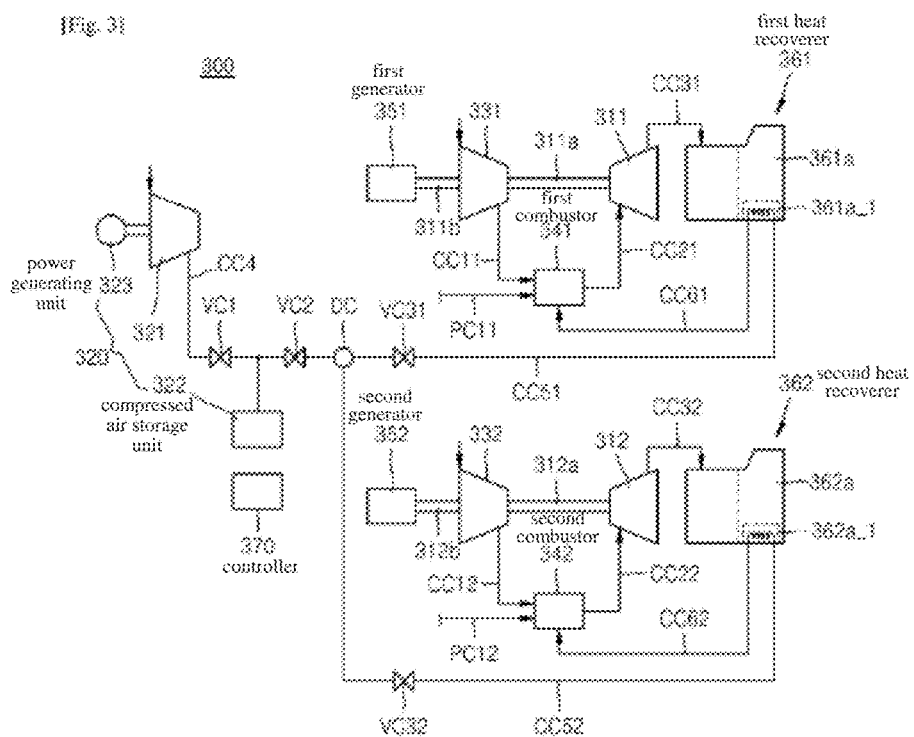
[Fig. 3]
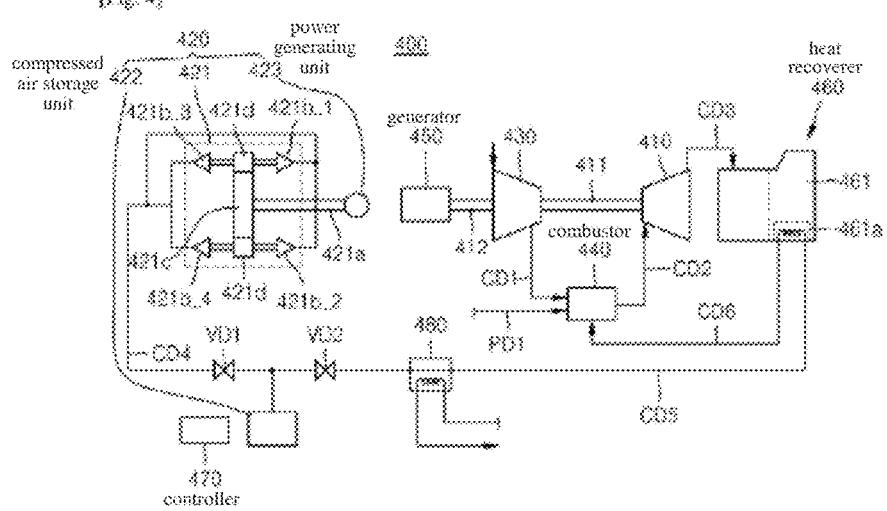
[Fig. 4]

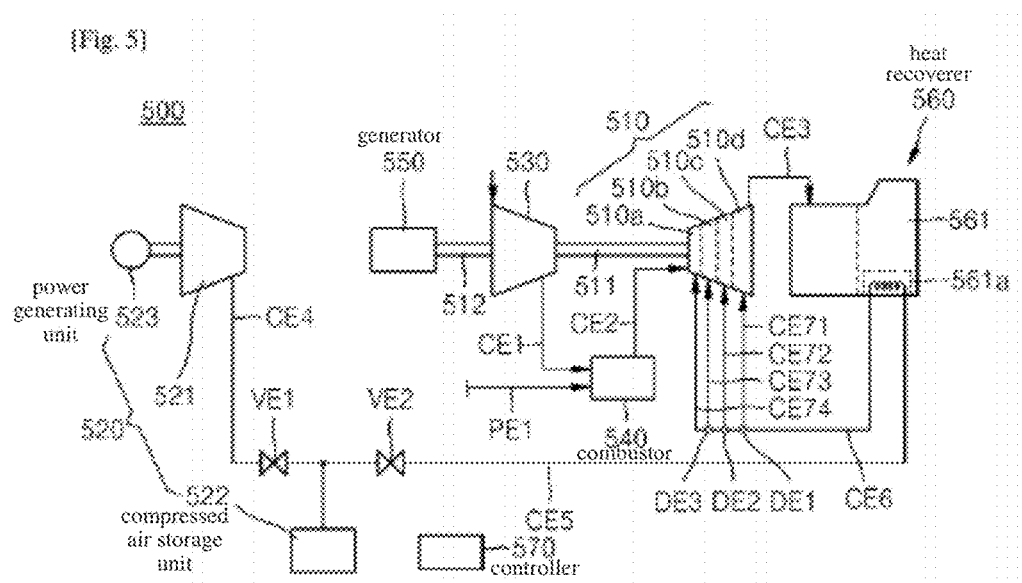

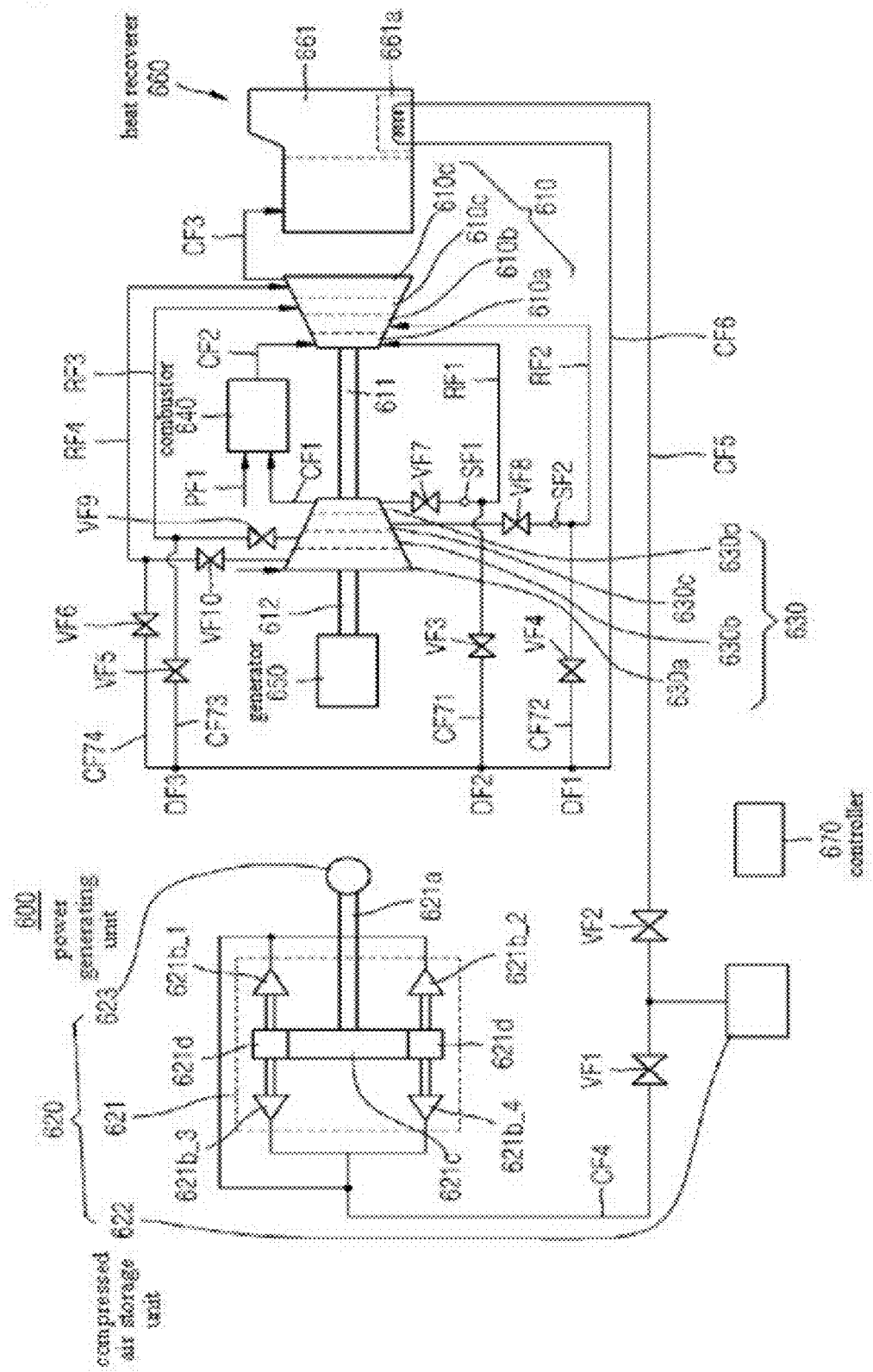

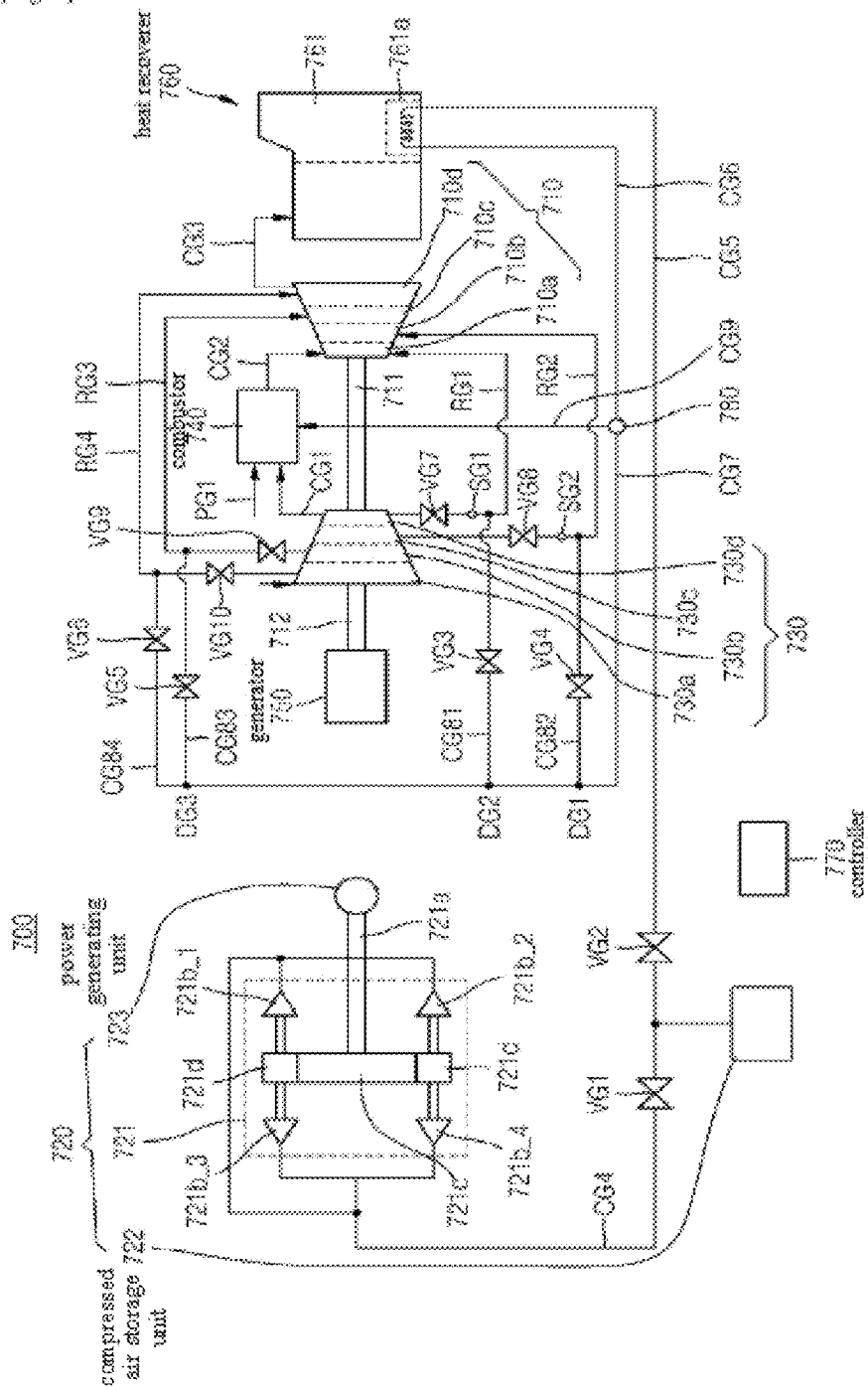

GAS TURBINE SYSTEM USING SUPPLEMENTAL COMPRESSED AIR TO COOL

TECHNICAL FIELD

The inventive concept relates to a gas turbine system.

BACKGROUND ART

A turbine apparatus is an apparatus for converting energy held by fluid such as water, a gas, and vapor into useful work.

Particularly, in a gas turbine apparatus, a gas of high temperature and high pressure coming from a combustor is introduced to a turbine portion and collides with a blade of a rotor, thereby rotating a turbine output shaft.

Development of a technology for improving the efficiency and output of a gas turbine apparatus has been made constantly. For example, Korean Patent Publication No. 1999-007437 discloses a technology regarding a gas turbine that improves an output and heat efficiency by spraying water drops in air supplied to a compressor.

DETAILED DESCRIPTION OF THE INVENTIVE CONCEPT

Technical Problem

The inventive concept provides a gas turbine system capable of improving an output.

Technical Solution

According to an aspect of the inventive concept, there is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion; and a compressed air supplier providing second compressed air to which the heat recovered by the heat recoverer is transferred, wherein at least a portion of the second compressed air to which the heat has been transferred is supplied to at least one of the combustor and the turbine portion.

According to another aspect of the inventive concept, there is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion and including a heat recovery steam generator; and a compressed air supplier providing second compressed air to which the heat recovered by the heat recoverer is transferred, wherein at least a portion of the second compressed air to which the heat has been transferred is supplied to the combustor.

According to further another aspect of the inventive concept, there is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion and including a heat recovery steam generator; and a compressed air supplier providing second compressed air to which the heat recovered by the heat recoverer is transferred, wherein at least a portion of the second compressed air to which the heat has been transferred is supplied to the turbine portion.

Advantageous Effects of the Invention

According to an aspect of the inventive concept, a gas turbine system capable of improving an output may be implemented.

DESCRIPTION OF THE DRAWINGS

FIG. 1 is a view illustrating a schematic configuration of a gas turbine system according to a first exemplary embodiment.

FIG. 2 is a view illustrating a schematic configuration of a gas turbine system according to a second exemplary embodiment.

FIG. 3 is a view illustrating a schematic configuration of a gas turbine system according to a third exemplary embodiment.

FIG. 4 is a view illustrating a schematic configuration of a gas turbine system according to a fourth exemplary embodiment.

FIG. 5 is a view illustrating a schematic configuration of a gas turbine system according to a fifth exemplary embodiment.

FIG. 6 is a view illustrating a schematic configuration of a gas turbine system according to a sixth exemplary embodiment.

FIG. 7 is a view illustrating a schematic configuration of a gas turbine system according to a seventh exemplary embodiment.

BEST MODE

According to an aspect of the inventive concept, there is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion; and a compressed air supplier providing second compressed air to which the heat recovered by the heat recoverer is transferred, wherein at least a portion of the second compressed air to which the heat has been transferred is supplied to at least one of the combustor and the turbine portion.

The compressing portion may include a plurality of compressing stages.

The turbine portion may include a plurality of expansion stages.

The second compressed air to which the heat has been transferred may be transferred to at least a portion of the plurality of expansion stages.

The compressing portion may include a plurality of compressing stages, and the turbine portion may include a plurality of expansion stages, and the compressing stage and the expansion stage may be connected by using a cooling duct line, and the at least portion of the second compressed air to which the heat has been transferred may be transferred to the cooling duct line.

The heat recoverer may include a stack to which the discharge gas is discharged, and a heat exchanger exchanging heat with the second compressed air may be disposed on the stack.

The heat recoverer may include a heat recovery steam generator.

The gas turbine system may further include a regenerative heat exchanger transferring heat to the second compressed air by using steam generated by the heat recovery steam generator.

The compressed air supplier may be driven by using power generated by the turbine portion.

The gas turbine system may further include a clutch controlling transfer of power which is generated by the turbine portion and transferred to the compressed air supplier.

The compressed air supplier may be driven by power generated by a power generating unit.

The compressed air supplier may include a plurality of compressors.

The compressed air supplier may include a compressed air storage unit in which the second compressed air is stored.

The gas turbine system may include a generator performing electricity generation by using power generated by the turbine portion.

The compressing portion, the combustor, the turbine portion, and the heat recoverer may be disposed in plural.

The gas turbine system may further include a branching unit allowing the second compressed air that has received the heat from the heat recoverer to branch off to a duct line connected to the combustor and a duct line connected to the turbine portion.

The gas turbine system may further include a controller controlling the compressing portion, the combustor, the turbine portion, the heat recoverer, and the compressed air supplier.

According to another aspect of the inventive concept, there is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion and including a heat recovery steam generator; and a compressed air supplier providing second compressed air to which the heat recovered by the heat recoverer is transferred, wherein at least a portion of the second compressed air to which the heat has been transferred is supplied to the combustor.

According to further another aspect of the inventive concept, there is provided a gas turbine system including: a compressing portion; a combustor generating a combustion operation by using first compressed air coming from the compressing portion; a turbine portion generating power by using a combustion gas coming from the combustor; a heat recoverer recovering a heat from a discharge gas of the turbine portion and including a heat recovery steam generator; and a compressed air supplier providing second compressed air to which the heat recovered by the heat recoverer is transferred, wherein at least a portion of the second compressed air to which the heat has been transferred is supplied to the turbine portion.

Mode of the Invention

Hereinafter, exemplary embodiments of the inventive concept are described in detail with reference to the accompanying drawings. Also, in the present specification and drawings, like reference numerals are used for components having substantially like construction, so that repeated description is omitted.

FIG. 1 is a view illustrating a schematic configuration of a gas turbine system according to a first exemplary embodiment. The first exemplary embodiment of the inventive concept is described below with reference to FIG. 1.

A gas turbine system 100 according to the first exemplary embodiment illustrated in FIG. 1 includes a turbine portion 110, a compressed air supplier 120, a compressing portion 130, a combustor 140, a generator 150, a heat recoverer 160, a controller 170, and a clutch 180.

The turbine portion 110 includes a known rotor (not shown), blades (not shown), and vanes (not shown) therein. Also, the turbine portion 110 includes an output shaft 111, and the output shaft 111 is connected with a shaft of the rotor inside the turbine portion 110.

The compressed air supplier 120 receives power from a rotational shaft 121, compresses air, produces second compressed air, and sends the same to the heat recoverer 160.

For the compressed air supplier 120, conventional turbo compressor, rotational compressor, reciprocating compressor, etc. may be used.

Though the compressed air supplier 120 according to an exemplary embodiment has a configuration of receiving power from the rotational shaft 121 and compressing air, the exemplary embodiment is not limited thereto. That is, the compressed air supplier according to an exemplary embodiment may be driven by receiving power from a separate motor (not shown), and in this case, the controller 170 controls the relevant motor.

Meanwhile, the compressing portion 130 produces first compressed air entering the combustor 140 by compressing air. For the compressing portion 130, conventional turbo compressor, rotational compressor, reciprocating compressor, etc. may be used.

The compressing portion 130 is driven by receiving power from the output shaft 111. That is, a driving shaft of the compressing portion 130 is integrally configured with the output shaft 111, and rotates by receiving power therefrom.

The combustor 140 generates a combustion gas of high temperature and high pressure by inputting fuel to the first compressed air coming from the compressing portion 130 via a duct line PA1 and generating a combustion operation. For the combustor 140, a known combustor generally used for a turbine apparatus may be used.

The generator 150 receives power from a shaft 112 connected with a shaft of the compressing portion 130 and performs electricity generation. According to the first exemplary embodiment, a driving shaft of the generator 150 is integrally configured with the shaft 112 and rotates by receiving power therefrom.

The gas turbine system 100 according to the first exemplary embodiment includes the generator 150, but the exemplary embodiment is not limited thereto. That is, the gas turbine system 100 according to the exemplary embodiment may be configured not to include the generator 150. In this case, the generated power may be used for driving other mechanical apparatuses, or immediately converted into thermal energy.

The heat recoverer 160 is a unit recovering a heat from a discharge gas of the turbine portion 110. A stack 161 to which the discharge gas is discharged is disposed in the rear portion. A heat exchanger 161a exchanging heat is disposed in the stack 161.

The heat recoverer 160 according to the first exemplary embodiment includes a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the heat recoverer 160, and facilities for discharging condensed water may be installed depending on the case. Since the heat recoverer 160 includes the heat recovery steam generator according to the first exemplary embodiment, steam is generated. When the steam is generated, the generated steam may be transferred to a steam turbine apparatus (not shown) afterward and used for secondary electricity generation.

The controller 170 includes an electric circuit, an integrated circuit chip, etc., and controls controlled portions by performing an operation according to a program operating the gas turbine system 100. Specific control operations thereof are described below.

Meanwhile, the clutch 180 adjusts power transfer connection between a shaft 113 connected to the shaft of the generator 150 and the rotational shaft 121. That is, the clutch 180 transfers power by connecting the shaft 113 with the rotational shaft 121, or blocks power transfer by disconnecting the connection between the shaft 113 and the rotational shaft 121.

The clutch 180 may be configured to be automatically controlled under control of the controller 170, and configured so that a user may manually control the clutch 180.

For the configuration of the clutch 180, a known clutch configuration may be used. For example, a claw clutch, a friction clutch, a magnetic clutch, a fluid clutch, a centrifugal clutch, etc. may be applied.

Hereinafter, an operation of the gas turbine system 100 according to the first exemplary embodiment is described with reference to FIG. 1.

When a user inputs a [power generation command] to the controller 170 to generate electricity, the controller 170 drives the compressing portion 130 by using an initial start motor (not shown), etc. to generate the first compressed air, and then transfers the generated first compressed air to the combustor 140 via a duct line CA1.

The first compressed air transferred to the combustor 140 is combusted with fuel to generate a combustion gas, and the combustion gas of high temperature and high pressure moves to the turbine portion 110 via a duct line CA2 and expands, thereby producing power.

When the turbine portion 110 produces power, the turbine portion 110 performs electricity generation by driving the generator 150 via the output shaft 111 and the shaft 112, and also allows the gas turbine system 100 to be driven continuously by driving the compressing portion 130 via the output shaft 111. Meanwhile, a discharge gas discharged from the turbine portion 110 moves to the heat recoverer 160 via a duct line CA3, so that heat is recovered, and then the discharge gas is discharged to outside. Here, the recovered heat of the discharged gas is used for a heat exchange operation at the heat exchanger 161a of the stack 161.

Meanwhile, the controller 170 connects the shaft 113 with the rotational shaft 121, and opens VA1 of a duct line CA4 and operates the clutch 180 according to a program stored in advance or a user's instruction.

When the rotational shaft 121 rotates by receiving power from the shaft 113, the compressed air supplier 120 produces the second compressed air.

The second compressed air produced by the compressed air supplier 120 is transferred to the heat exchanger 161a via the duct line CA4, receives heat recovered from the discharge gas at the heat exchanger 161a, and then is transferred to the combustor 140 via the duct line CA5.

When the heated second compressed air is transferred to the combustor 140, the output of the gas turbine system 100 improves. That is, during the daytime in the summer season where the peak of electric power frequently occurs, the output of composite thermal power reduces due to a rise of the atmospheric temperature, and in the case where the atmospheric temperature is about 30° C., improvement of about 20% in the output is possible by putting compressed air in the combustor 140.

That is, according to the first exemplary embodiment, the output may be improved even without increasing the temperature of the entry of the turbine portion 110, and additional improvement of 5% to 10% in the output is possible within a limit of a stall of the compressing portion 130.

FIG. 2 is a view illustrating a schematic configuration of a gas turbine system according to a second exemplary embodiment. Hereinafter, the second exemplary embodiment is described with reference to FIG. 2.

A gas turbine system 200 according to the second exemplary embodiment includes a turbine portion 210, a compressed air supplier 220, a compressing portion 230, a combustor 240, a generator 250, a heat recoverer 260, a controller 270, a clutch 280, and a regenerative heat exchanger 290.

The turbine portion 210 includes a known rotor (not shown), blades (not shown), and vanes (not shown) therein. Also, the turbine portion 210 includes an output shaft 211, and the output shaft 211 is connected with a shaft of the rotor inside the turbine portion 210.

The turbine portion 210 includes a multi-stage structure having four expansion stages. That is, the turbine portion 210 includes a first expansion stage 210a, a second expansion stage 210b, a third expansion stage 210c, and a fourth expansion stage 210d in the order ranging from a high pressure stage to a low pressure stage.

According to the second exemplary embodiment, for description, the turbine portion 210 includes the structure having the four expansion stages, but the exemplary embodiment is not limited thereto. That is, according to the exemplary embodiment, a number of the expansion stages of the turbine portion 210 is not particularly limited. For example, a number of the expansion stages of the turbine portion 210 may be 1, 2, 3, 5, 10, etc.

The compressed air supplier 220 includes a rotational shaft 221, compressors 222a, 222b, 222c, and 222d, a first gear 223, and a second gear 224.

The compressors 222a, 222b, 222c, and 222d produce second compressed air by compressing air, and may be conventional compressor, rotational compressor, reciprocating compressor, etc.

A first gear 223 is mounted on the rotational shaft 221, and a second gear 224 is engaged with the first gear 223. The first gear 223 and the second gear 224 have a form of a spur gear.

The rotational shaft 221 receives power from the clutch 280 and rotates the first gear 223 mounted on the rotational shaft 221. When the first gear 223 rotates, the second gear 224 engaged therewith also rotates. When the second gear 224 rotates, the four compressors 222a, 222b, 222c, and 222d connected with a shaft of the second gear 224 receive power and are driven.

The second exemplary embodiment has a configuration in which the first gear 223 and the second gear 224 are engaged with each other and transfer power of the rotational shaft 221 to the four compressors 222a, 222b, 222c, and 222d, but the exemplary embodiment is not limited thereto. That is, according to an exemplary embodiment, a configuration of a power transfer means of the relevant portion is not particularly limited. For example, besides the first gear 223 and the second gear 224, a third gear, a fourth gear, etc. may be additionally configured, and the form of a gear may be a helical gear, a double helical gear, a bevel gear, etc. Also, a power transfer means such as a belt transmission, a chain transmission, and a frictional wheel transmission, not a gear transmission may be used.

The compressed air supplier 220 according to the second exemplary embodiment includes the four compressors 222a, 222b, 222c, and 222d, but the exemplary embodiment is not limited thereto. That is, a number of the compressors provided to the compressed air supplier according to an exemplary embodiment is not particularly limited. For example, the compressed air supplier may include one, two, three, five, six, and more compressors.

The compressed air supplier 220 according to the second exemplary embodiment has a configuration of receiving power from the rotational shaft 221 and compressing air, but the exemplary embodiment is not limited thereto. That is, the compressed air supplier according to an exemplary embodiment may be driven by receiving power from a separate motor (not shown). In this case, the controller 270 controls the relevant motor.

Meanwhile, the compressing portion 230 produces first compressed air entering the combustor 240 by compressing air. For the compressing portion 230, conventional turbo compressor, rotational compressor, reciprocating compressor, etc. may be used.

The compressing portion 230 is driven by receiving power from the output shaft 211. That is, a driving shaft of the compressing portion 230 is integrally configured with the output shaft 211 and rotates by receiving power therefrom.

The combustor 240 generates a combustion gas of high temperature and high pressure by inputting fuel to the first compressed air coming from the compressing portion 230 via a duct line PB1 and generating a combustion operation. For the combustor 240, a known combustor generally used for a turbine apparatus may be used.

The generator 250 receives power from a shaft 212 connected with a shaft of the compressing portion 230 and performs electricity generation. According to the second exemplary embodiment, a driving shaft of the generator 250 is integrally configured with the shaft 212 and rotates by receiving power therefrom.

The gas turbine system 200 according to the second exemplary embodiment includes the generator 250, but the exemplary embodiment is not limited thereto. That is, the gas turbine system 200 according to the exemplary embodiment may be configured not to include the generator 250. In this case, the generated power may be used for driving other mechanical apparatuses, or immediately converted into thermal energy.

The heat recoverer 260 is a unit recovering a heat from a discharge gas of the turbine portion 210. A stack 161 to which the discharge gas is discharged is disposed in the rear portion. A heat exchanger 261a exchanging heat is disposed in the stack 261.

The heat recoverer 260 according to the second exemplary embodiment includes a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the heat recoverer 260, and facilities for discharging condensed water may be installed depending on the case. Since the heat recoverer 260 includes the heat recovery steam generator according to the second exemplary embodiment, steam is generated. When the steam is generated, the generated steam may be transferred to a steam turbine apparatus (not shown) afterward and used for secondary electricity generation.

The controller 270 includes an electric circuit, an integrated circuit chip, etc., and controls controlled portions by performing an operation according to a program operating the gas turbine system 200. Specific control operations thereof are described below.

Meanwhile, the clutch 280 adjusts power transfer connection between a shaft 213 connected to the shaft of the generator 250 and the rotational shaft 221. That is, the clutch 280 transfers power by connecting the shaft 213 with the rotational shaft 221, or blocks power transfer by disconnecting the connection between the shaft 213 and the rotational shaft 221.

The clutch 280 may be configured to be automatically controlled under control of the controller 270, and configured so that a user may manually control the clutch 280.

For the configuration of the clutch 280, a known clutch configuration may be used. For example, a claw clutch, a friction clutch, a magnetic clutch, a fluid clutch, a centrifugal clutch, etc. may be applied.

Meanwhile, a regenerative heat exchanger 290 is a unit exchanging heat by using heat of steam generated from the heat recoverer 260 or using heat of condensed water. The second compressed air coming from the compressed air supplier 220 receives heat while passing through the regenerative heat exchanger 290.

Hereinafter, an operation of the gas turbine system 200 according to the second exemplary embodiment is described with reference to FIG. 2.

When a user inputs a [power generation command] to the controller 270 to generate electricity, the controller 270 drives the compressing portion 230 by using an initial start motor (not shown), etc. to generate the first compressed air, and then transfers the generated first compressed air to the combustor 240 via a duct line CB1.

The first compressed air transferred to the combustor 240 is combusted with fuel to generate a combustion gas, and the combustion gas of high temperature and high pressure moves to the turbine portion 210 via a duct line CB2 and expands, thereby producing power.

When the turbine portion 210 produces power, the turbine portion 210 performs electricity generation by driving the generator 250 via the output shaft 211 and the shaft 212, and also allows the gas turbine system 200 to be driven continuously by driving the compressing portion 230 via the output shaft 211. Meanwhile, a discharge gas discharged from the turbine portion 210 moves to the heat recoverer 260 via a duct line CB3, so that heat is recovered, and then the discharge gas is discharged to outside. Here, the recovered heat of the discharged gas is used for a heat exchange operation at the heat exchanger 261a of the stack 261.

Meanwhile, the controller 270 connects the shaft 213 with the rotational shaft 221, and opens VB1 of a duct line CB4 and operates the clutch 280 according to a program stored in advance or a user's instruction.

When the rotational shaft 221 rotates by receiving power from the shaft 213, the compressed air supplier 220 produces the second compressed air.

The second compressed air produced by the compressed air supplier 220 is transferred to the regenerative heat exchanger 290 via a duct line CB4 and receives heat primarily, and subsequently the second compressed air is transferred to the heat exchanger 261a via a duct line CB5 and receives heat secondarily. Subsequently, the second compressed air that has received heat at the heat exchanger 261a is transferred to the combustor 240 via a duct line CB6.

When the heated second compressed air is transferred to the combustor 240, the output of the gas turbine system 200 improves. That is, during the daytime in the summer season where the peak of electric power frequently occurs, the output of composite thermal power reduces due to a rise of the atmospheric temperature, and in the case where the atmospheric temperature is about 30° C., improvement of about 20% in the output is possible by putting compressed air in the combustor 240.

That is, according to the second exemplary embodiment, the output may be improved even without increasing the temperature of the entry of the turbine portion 210, and additional improvement of 5% to 10% in the output is possible within a limit of a stall of the compressing portion 230. Particularly, according to the second exemplary embodiment, since heat is transferred to the second compressed air primarily by using the regenerative heat exchanger 290, not only the output but also efficiency may improve.

FIG. 3 is a view illustrating a schematic configuration of a gas turbine system according to a third exemplary embodiment. Hereinafter, the third exemplary embodiment is described with reference to FIG. 3.

A gas turbine system 300 according to the third exemplary embodiment includes a first turbine portion 311, a second turbine portion 312, a compressed air supplier 320, a first compressing portion 331, a second compressing portion 332, a first combustor 341, a second combustor 342, a first generator 351, a second generator 352, a first heat recoverer 361, a second heat recoverer 362, and a controller 370.

Each of the first turbine portion 311 and the second turbine portion 312 includes a known rotor (not shown), blades (not shown), and vanes (not shown) therein. Also, the first turbine portion 311 and the second turbine portion 312 have output shafts 311a and 312a, respectively, and the output shafts 311a and 312a are respectively connected with shafts of the rotors inside the first turbine portion 311 and the second turbine portion 312.

The compressed air supplier 320 includes a compressor 321, a compressed air storage unit 322, and a power generating unit 323.

The compressor 321 has a configuration of receiving power from the power generating unit 323 and producing second compressed air by compressing air. For the compressor 321, conventional turbo compressor, rotational compressor, reciprocating compressor, etc. may be used.

For the power generating unit 323, a motor, an engine, etc. may be used. For the motor, an alternating current motor, a direct current motor, a servo motor, etc. may be used. For the engine, a heat engine, an internal combustion engine, etc. may be used.

The second compressed air compressed by the compressor 321 is stored in the compressed air storage unit 322 including a storage tank, etc. by way of a duct line CC4, and when needed, the second compressed air is extracted, and then transferred to the first heat recoverer 361 and the second heat recoverer 362 by way of a divider DC.

Meanwhile, the first compressing portion 331 and the second compressing portion 332 produce first compressed air entering the first combustor 341 and the second combustor 342 by compressing air, respectively. For the first compressing portion 331 and the second compressing portion 332, conventional turbo compressor, rotational compressor, reciprocating compressor, etc. may be used.

The first compressing portion 331 and the second compressing portion 332 are driven by receiving power from the output shafts 311a and 312a, respectively. That is, driving shafts of the first compressing portion 331 and the second compressing portion 332 are integrally configured with the output shafts 311a and 312a, respectively, and rotate by receiving power therefrom.

Meanwhile, the first combustor 341 and the second combustor 342 generate a combustion gas of high temperature and high pressure by inputting fuel to the first compressed air respectively coming from the first compressing portion 331 and the second compressing portion 332 via duct lines PC11 and PC12 and generating a combustion operation. For the first and second combustors 341 and 342, a known combustor generally used for a turbine apparatus may be used.

The first generator 351 and the second generator 352 receive power from shafts 311b and 312b respectively connected with a shaft of the first compressing portion 331 and a shaft of the second compressing portion 332 and perform electricity generation. According to the present exemplary embodiment, driving shafts of the first generator 351 and the second generator 352 are integrally configured with the shafts 311b and 312b, respectively, and rotate by receiving power therefrom.

The gas turbine system 300 according to the third exemplary embodiment includes the first generator 351 and the second generator 352 but the exemplary embodiment is not limited thereto. That is, the gas turbine system 300 according to the exemplary embodiment may be configured not to include the first generator 351 and the second generator 352. In this case, the generated power may be used for driving other mechanical apparatuses, or immediately converted into thermal energy.

The first heat recoverer 361 and the second heat recoverer 362 are units recovering a heat from a discharge gas of the first turbine portion 311 and the second turbine portion 312. Stacks 361a and 362a to which the discharge gas is discharged are disposed in the rear portion. Heat exchangers 361a_1 and 362a_1 exchanging heat are disposed in the stacks 361a and 362a.

The first heat recoverer 361 and the second heat recoverer 362 according to the third exemplary embodiment include a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the first heat recoverer 361 and the second heat recoverer 362, and facilities for discharging condensed water may be installed depending on the case. Since the first heat recoverer 361 and the second heat recoverer 362 include the heat recovery steam generator according to the third exemplary embodiment, steam is generated. When the steam is generated, the generated steam may be transferred to a steam turbine apparatus (not shown) afterward and used for secondary electricity generation.

The controller 370 includes an electric circuit, an integrated circuit chip, etc., and controls controlled portions by performing an operation according to a program operating the gas turbine system 300. Specific control operations thereof are described below.

Hereinafter, an operation of the gas turbine system 300 according to the third exemplary embodiment is described with reference to FIG. 3.

When a user inputs a [power generation command] to the controller 370 to generate electricity, the controller 370 drives the first compressing portion 331 and the second compressing portion 332 by using an initial start motor (not shown), etc. to generate the first compressed air, and then transfers the generated first compressed air to the first combustor 341 and the second combustor 342 via duct lines CC11 and CC12, respectively.

The first compressed air transferred to the first combustor 341 and the second combustor 342 is combusted with fuel to generate a combustion gas, and the combustion gas of high temperature and high pressure moves to the first turbine portion 311 and the second turbine portion 312 via duct lines CC21 and CC22 and expands, thereby producing power.

When the first turbine portion 311 and the second turbine portion 312 produce power, the first turbine portion 311 and the second turbine portion 312 perform electricity generation by respectively driving the first generator 351 and the second generator 352 via the output shafts 311a and 312a and the shafts 311b and 312b, and also allow the gas turbine system 300 to be driven continuously by respectively driving the first compressing portion 331 and the second compressing portion 332 via the output shafts 311a and 312a. Meanwhile, a discharge gas discharged from the first turbine portion 311 and the second turbine portion 312 respectively move to the first heat recoverer 361 and the second heat recoverer 362 via duct lines CC31 and CC32, so that heat is recovered, and then the discharge gas is discharged to outside. Here, the recovered heat of the discharged gas is used for a heat exchange operation at the heat exchangers 361a_1 and 362a_1.

Meanwhile, the controller 370 drives the compressor 321 by driving the power generating unit 323 and controls to open a valve VC1 according to a program stored in advance or a user's instruction.

Therefore, the second compressed air compressed by the compressor 321 is stored in the compressed air storage unit 322 by way of a duct line CC4. When needed, the controller 370 extracts the second compressed air from the compressed air storage unit 322 by controlling a valve VC2, and transfers the second compressed air to the first heat recoverer 361 and the second heat recoverer 362 by way of a divider DC by controlling valves V31 and V32. Here, the divider DC connected to the duct line CC4 may be configured by using a variable valve in which an opening degree may be adjusted by the controller 370. In this case, the controller 370 may adjust the divider DC to an opening degree that may implement a maximum performance according to an internal operating program.

The second compressed air that has passed through the divider DC is transferred to the heat exchangers 361a_1 and 362a_1 via duct lines CC51 and CC52, respectively, receives heat recovered from the discharge gas at the heat exchangers 361a_1 and 362a_1, respectively, and then is transferred to the first combustor 341 and the second combustor 342 via duct lines CC61 and CC62.

When the heated second compressed air is transferred to the first combustor 341 and the second combustor 342, the output of the gas turbine system 300 improves. That is, during the daytime in the summer season where the peak of electric power frequently occurs, the output of composite thermal power reduces due to a rise of the atmospheric temperature, and in the case where the atmospheric temperature is about 30° C., improvement of about 20% in the output is possible by putting compressed air in the first combustor 341 and the second combustor 342.

That is, according to the third exemplary embodiment, the output may be improved even without increasing the temperature of the entry of the first turbine portion 311 and the second turbine portion 312, and additional improvement of 5% to 10% in the output is possible within a limit of a stall of the first compressing portion 331 and the second compressing portion 332.

Also, according to the third exemplary embodiment, since the compressed air supplier 320 includes the compressed air storage unit 322, the compressed air supplier 320 may produce and store the second compressed air when electric power is cheap, and then extract and use the stored second compressed air when needed. By doing so, energy costs may be reduced.

FIG. 4 is a view illustrating a schematic configuration of a gas turbine system according to a fourth exemplary embodiment. Hereinafter, the fourth exemplary embodiment is described with reference to FIG. 4.

A gas turbine system 400 according to the fourth exemplary embodiment includes a turbine portion 410, a compressed air supplier 420, a compressing portion 430, a combustor 440, a generator 450, a heat recoverer 460, a controller 470, and a regenerative heat exchanger 480.

The turbine portion 410 includes a known rotor (not shown), blades (not shown), and vanes (not shown) therein. Also, the turbine portion 410 includes an output shaft 411, and the output shaft 411 is connected with a shaft of the rotor inside the turbine portion 410.

The compressed air supplier 420 includes a compressing unit 421, a compressed air storage unit 422, and a power generating unit 423.

The compressing unit 421 has a configuration of receiving power from the power generating unit 423 and producing second compressed air by compressing air. For the compressing unit 421, conventional turbo compressor, rotational compressor, reciprocating compressor, etc. may be used.

The compressing unit 421 includes a rotational shaft 421a, four compressors 421b_1, 421b_2, 421b_3, and 421b_4, a first gear 421c, and a second gear 421d.

The rotational shaft 421a is connected with a shaft of the power generating unit 423.

The compressors 421b_1, 421b_2, 421b_3, and 421b_4 produce the second compressed air by compressing air. For the compressors, conventional turbo compressor, rotational compressor, reciprocating compressor, etc. may be used.

The first gear 421c is mounted on the rotational shaft 421a, and the second gear 421d is engaged with the first gear 421c. The first gear 421c and the second gear 421d have a form of a spur gear.

The rotational shaft 421a receives power from the power generating unit 423 and rotates the first gear 421c mounted on the rotational shaft 421a. When the first gear 421c rotates, the second gear 421d engaged therewith also rotates. When the second gear 421d rotates, the four compressors 421b_1, 421b_2, 421b_3, and 421b_4 connected with a shaft of the second gear 421d are driven by receiving power therefrom.

The fourth exemplary embodiment has a configuration in which the first gear 421c and the second gear 421d are engaged with each other and transfer the power of the rotational shaft 421a to the four compressors 421b_1, 421b_2, 421b_3, and 421b_4, but the exemplary embodiment is not limited thereto. That is, according to an exemplary embodiment, a configuration of a power transfer means of the relevant portion is not particularly limited. For example, besides the first gear 421c and the second gear 421d, a third gear, a fourth gear, etc. may be additionally configured, and the form of a gear may be a helical gear, a double helical gear, a bevel gear, etc. Also, a power transfer means such as a belt transmission, a chain transmission, and a frictional wheel transmission, not a gear transmission may be used.

The compressing unit 421 according to the fourth exemplary embodiment includes the four compressors 421b_1, 421b_2, 421b_3, and 421b_4, but an exemplary embodiment is not limited thereto. That is, a number of the compressors provided to a compressing portion according to an exemplary embodiment is not particularly limited. For example, the compressing portion may include one, two, three, five, six, and more compressors.

For the power generating unit 423, a motor, an engine, etc. may be used. For the motor, an alternating current motor, a direct current motor, a servo motor, etc. may be used. For the engine, a heat engine, an internal combustion engine, etc. may be used.

The second compressed air compressed by the compressing unit 421 is stored in the compressed air storage unit 422 including a storage tank, etc. by way of a duct line CD4, and when needed, the second compressed air is extracted, and then transferred to the regenerative heat exchanger 480.

Meanwhile, the compressing portion 430 produces first compressed air entering the combustor 440 by compressing air. For the compressing portion 430, conventional turbo compressor, rotational compressor, reciprocating compressor, etc. may be used.

The compressing portion 430 is driven by receiving power from the output shaft 411. That is, a driving shaft of the compressing portion 430 is integrally configured with the output shaft 411, and rotates by receiving power therefrom.

The combustor 440 generates a gas of high temperature and high pressure by inputting fuel to the first compressed air coming from the compressing portion 430 via a duct line PD1 and generating a combustion operation. For the combustor 440, a known combustor generally used for a turbine apparatus may be used.

The generator 450 receives power from a shaft 412 connected with a shaft of the compressing portion 430 and performs electricity generation. According to the fourth exemplary embodiment, a driving shaft of the generator 450 is integrally configured with the shaft 412 and rotates by receiving power therefrom.

The gas turbine system 400 according to the present exemplary embodiment includes the generator 450, but the exemplary embodiment is not limited thereto. That is, the gas turbine system 400 according to the exemplary embodiment may be configured not to include the generator 450. In this case, the generated power may be used for driving other mechanical apparatuses, or immediately converted into thermal energy.

The heat recoverer 460 is a unit recovering a heat from a discharge gas of the turbine portion 410. A stack 461 to which the discharge gas is discharged is disposed in the rear portion. A heat exchanger 461a exchanging heat is disposed in the stack 461.

The heat recoverer 460 according to the fourth exemplary embodiment includes a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the heat recoverer 460, and facilities for discharging condensed water may be installed depending on the case. Since the heat recoverer 460 includes the heat recovery steam generator according to the fourth exemplary embodiment, steam is generated. When the steam is generated, the generated steam may be transferred to a steam turbine apparatus (not shown) afterward and used for secondary electricity generation.

The controller 470 includes an electric circuit, an integrated circuit chip, etc., and controls controlled portions by performing an operation according to a program operating the gas turbine system 400. Specific control operations thereof are described below.

Meanwhile, the regenerative heat exchanger 480 is a unit for exchanging heat by using heat of steam generated by the heat recoverer 460 or using heat of discharged condensed water. The second compressed air coming from the compressed air supplier 420 receives heat while passing through the regenerative heat exchanger 480.

Hereinafter, an operation of the gas turbine system 400 according to the fourth exemplary embodiment is described with reference to FIG. 4.

When a user inputs a [power generation command] to the controller 470 to generate electricity, the controller 470 drives the compressing portion 430 by using an initial start motor (not shown), etc. to generate the first compressed air, and then transfers the generated first compressed air to the combustor 440 via a duct line CD1.

The first compressed air transferred to the combustor 440 is combusted with fuel to generate a combustion gas, and the combustion gas of high temperature and high pressure moves to the turbine portion 410 via a duct line CD2 and expands, thereby producing power.

When the turbine portion 410 produces power, the turbine portion 410 performs electricity generation by driving the generator 450 via the output shaft 411 and the shaft 412, and also allows the gas turbine system 400 to be driven continuously by driving the compressing portion 430 via the output shaft 411. Meanwhile, a discharge gas discharged from the turbine portion 410 moves to the heat recoverer 460 via a duct line CD3, so that heat is recovered, and then the discharge gas is discharged to outside. Here, the recovered heat of the discharged gas is used for a heat exchange operation at the heat exchanger 461a of the stack 461.

Meanwhile, the controller 470 drives the compressing unit 421 by driving the power generating unit 423 and controls to open a valve VD1 according to a program stored in advance or a user's instruction.

The second compressed air compressed by the compressing unit 421 is stored in the compressed air storage unit 422 by way of a duct line CD4. When needed, the controller 470 extracts the second compressed air from the compressed air storage unit 422 by controlling a valve VD2, and transfers the extracted second compressed air to the regenerative heat exchanger 480 to allow the second compressed air to receive heat primarily. Subsequently, the second compressed air is transferred to the heat exchanger 461*a* via a duct line CD5 and receives heat secondarily, and then the second compressed air that has received heat at the heat exchanger 461*a* is transferred to the combustor 440 via a duct line CD6.

When the heated second compressed air is transferred to the combustor 440, the output of the gas turbine system 400 improves. That is, during the daytime in the summer season where the peak of electric power frequently occurs, the output of composite thermal power reduces due to a rise of the atmospheric temperature, and in the case where the atmospheric temperature is about 30° C., improvement of about 20% in the output is possible by putting compressed air in the combustor 440.

That is, according to the fourth exemplary embodiment, the output may be improved even without increasing the temperature of the entry of the turbine portion 410, and additional improvement of 5% to 10% in the output is possible within a limit of a stall of the compressing portion 430. Particularly, according to the fourth exemplary embodiment, since heat is transferred to the second compressed air primarily by using the regenerative heat exchanger 480, not only the output but also efficiency may improve.

Also, according to the fourth exemplary embodiment, since the compressed air supplier 420 includes the compressed air storage unit 422, the compressed air supplier 420 may produce and store the second compressed air when electric power is cheap, and then extract and use the stored second compressed air when needed. By doing so, energy costs may be reduced.

FIG. 5 is a view illustrating a schematic configuration of a gas turbine system according to a fifth exemplary embodiment. Hereinafter, the fifth exemplary embodiment is described with reference to FIG. 5.

A gas turbine system 500 according to the fifth exemplary embodiment includes a turbine portion 510, a compressed air supplier 520, a compressing portion 530, a combustor 540, a generator 550, a heat recoverer 560, and a controller 570.

The turbine portion 510 includes a known rotor (not shown), blades (not shown), and vanes (not shown) therein. Also, the turbine portion 510 includes an output shaft 511, and the output shaft 511 is connected with a shaft of the rotor inside the turbine portion 510.

The turbine portion 510 includes a multi-stage structure having four expansion stages. That is, the turbine portion 510 includes a first expansion stage 510*a*, a second expansion stage 510*b*, a third expansion stage 510*c*, and a fourth expansion stage 510*d* in the order ranging from a high pressure stage to a low pressure stage.

According to the fifth exemplary embodiment, for description, the turbine portion 510 includes the structure having the four expansion stages, but the exemplary embodiment is not limited thereto. That is, according to the exemplary embodiment, a number of the expansion stages of the turbine portion 510 is not particularly limited. For example, a number of the expansion stages of the turbine portion 510 may be 1, 2, 3, 5, 10, etc.

The compressed air supplier 520 includes a compressor 521, a compressed air storage unit 522, and a power generating unit 523.

The compressor 521 has a configuration of receiving power from the power generating unit 523 and producing second compressed air by compressing air. For the compressor 521, conventional turbo compressor, rotational compressor, and reciprocating compressor may be used.

For the power generating unit 523, a motor, an engine, etc. may be used. For the motor, an alternating current motor, a direct current motor, a servo motor, etc. may be used. For the engine, a heat engine, an internal combustion engine, etc. may be used.

The second compressed air compressed by the compressor 521 is stored in the compressed air storage unit 522 including a storage tank, etc. by way of a duct line CE4, and when needed, the second compressed air is extracted, and then transferred to the heat recoverer 560.

Meanwhile, the compressing portion 530 produces first compressed air entering the combustor 540 by compressing air. For the compressing portion 530, conventional turbo compressor, rotational compressor, reciprocating compressor, etc. may be used.

The compressing portion 530 is driven by receiving power from the output shaft 511. That is, a driving shaft of the compressing portion 530 is integrally configured with the output shaft 511, and rotates by receiving power therefrom.

The combustor 540 generates a gas of high temperature and high pressure by inputting fuel to the first compressed air coming from the compressing portion 530 via a duct line PE1 and generating a combustion operation. For the combustor 540, a known combustor generally used for a turbine apparatus may be used.

The generator 550 receives power from a shaft 512 connected with a shaft of the compressing portion 530 and performs electricity generation. According to the fifth exemplary embodiment, a driving shaft of the generator 550 is integrally configured with the shaft 512 and rotates by receiving power therefrom.

The gas turbine system 500 according to the fifth exemplary embodiment includes the generator 550, but the exemplary embodiment is not limited thereto. That is, the gas turbine system 500 according to the exemplary embodiment may be configured not to include the generator 550. In this case, the generated power may be used for driving other mechanical apparatuses, or immediately converted into thermal energy.

The heat recoverer 560 is a unit recovering a heat from a discharge gas of the turbine portion 510. A stack 561 to which the discharge gas is discharged is disposed in the rear portion. A heat exchanger 561*a* exchanging heat is disposed in the stack 561.

The heat recoverer 560 according to the fifth exemplary embodiment includes a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the heat recoverer 560, and facilities for discharging condensed water may be installed depending on the case. Since the heat recoverer 560 includes the heat recovery steam generator according to the fifth exemplary embodiment, steam is generated. When the steam is generated, the generated steam may be transferred to a steam turbine apparatus (not shown) afterward and used for secondary electricity generation.

The controller 570 includes an electric circuit, an integrated circuit chip, etc., and controls controlled portions by performing an operation according to a program operating the gas turbine system 500. Specific control operations thereof are described below.

Hereinafter, an operation of the gas turbine system 500 according to the fifth exemplary embodiment is described with reference to FIG. 5.

When a user inputs a [power generation command] to the controller 570 to generate electricity, the controller 570 drives the compressing portion 530 by using an initial start motor (not shown), etc. to generate the first compressed air, and then transfers the generated first compressed air to the combustor 540 via a duct line CE1.

The first compressed air transferred to the combustor 540 is combusted with fuel to generate a combustion gas, and the gas of high temperature and high pressure moves to the turbine portion 510 via a duct line CE2 and expands, thereby producing power.

When the turbine portion 510 produces power, the turbine portion 510 performs electricity generation by driving the generator 550 via the output shaft 511 and the shaft 512, and also allows the gas turbine system 500 to be driven continuously by driving the compressing portion 530 via the output shaft 511. Meanwhile, a discharge gas discharged from the turbine portion 510 moves to the heat recoverer 560 via a duct line CE3, so that heat is recovered, and then the discharge gas is discharged to outside. Here, the recovered heat of the discharged gas is used for a heat exchange operation at the heat exchanger 561a of the stack 561.

Meanwhile, the controller 570 drives the compressor 521 by driving the power generating unit 523 and controls to open a valve VE1 according to a program stored in advance or a user's instruction.

Therefore, the second compressed air compressed by the compressor 521 is stored in the compressed air storage unit 522 by way of a duct line CE4. When needed, the controller 570 extracts the second compressed air from the compressed air storage unit 522 and transfers the extracted second compressed air to the heat recoverer 560 by way of a duct line CE5 by controlling a valve VE2.

The second compressed air transferred to the heat exchanger 561a via the duct line CE5 receives heat recovered from the discharge gas, and then flows through a duct line CE6, respectively passes through duct lines CE71, CE72, CE73, and CE74 by way of dividers DE1, DE2, and DE3, and is respectively transferred to a fourth expansion stage 510d, a third expansion stage 510c, a second expansion stage 510b, and a first expansion stage 510a of the turbine portion 510. Here, each of the dividers DE1, DE2, and DE3 connected to the duct line CE6 may be configured by using a variable valve in which an opening degree may be adjusted by the controller 570. In this case, the controller 570 may adjust the dividers DE1, DE2, and DE3 to an opening degree that may implement a maximum performance according to an internal operating program.

The second compressed air entering each stage of the turbine portion 510 cools down the turbine portion 510. When the turbine portion 510 is cooled down, overheating of the rotor (not shown), the blades (not shown), and the vanes (not shown) of the turbine portion 510 are prevented, so that the life of turbine portion 510 may extend, and since the compressing portion 530 does not separately extract compressed air to cool down the turbine portion 510, the pressure of the compressing portion 530 is maintained, so that additional improvement of 5% to 20% in the output is possible on the whole within a limit of a stall of the compressing portion 530.

Also, according to the fifth exemplary embodiment, since the compressed air supplier 520 includes the compressed air storage unit 522, the compressed air supplier 520 may produce and store the second compressed air when electric power is cheap, and then extract and use the stored second compressed air when needed. By doing so, energy costs may be reduced.

FIG. 6 is a view illustrating a schematic configuration of a gas turbine system according to a sixth exemplary embodiment. Hereinafter, the sixth exemplary embodiment is described with reference to FIG. 6.

A gas turbine system 600 according to the sixth exemplary embodiment includes a turbine portion 610, a compressed air supplier 620, a compressing portion 630, a combustor 640, a generator 650, a heat recoverer 660, and a controller 670.

The turbine portion 610 includes a known rotor (not shown), blades (not shown), and vanes (not shown) therein. Also, the turbine portion 610 includes an output shaft 611, and the output shaft 611 is connected with a shaft of the rotor inside the turbine portion 610.

The turbine portion 610 includes a multi-stage structure having four expansion stages. That is, the turbine portion 610 includes a first expansion stage 610a, a second expansion stage 610b, a third expansion stage 610c, and a fourth expansion stage 610d in the order ranging from a high pressure stage to a low pressure stage.

According to the sixth exemplary embodiment, for description, the turbine portion 610 includes the structure having the four expansion stages, but the exemplary embodiment is not limited thereto. That is, according to the exemplary embodiment, a number of the expansion stages of the turbine portion 610 is not particularly limited. For example, a number of the expansion stages of the turbine portion 610 may be 1, 2, 3, 5, 10, etc.

Meanwhile, the compressed air supplier 620 includes a compressing unit 621, a compressed air storage unit 622, and a power generating unit 623.

The compressing unit 621 has a configuration of receiving power from the power generating unit 623 and producing second compressed air by compressing air. For the compressing unit 621, conventional turbo compressor, rotational compressor, and reciprocating compressor may be used.

The compressing unit 621 includes a rotational shaft 621a, four compressors 621b_1, 621b_2, 621b_3, and 621b_4, a first gear 621c, and a second gear 621d.

The rotational shaft 621a is connected to a shaft of the power generating unit 623.

The compressors 621b_1, 621b_2, 621b_3, and 621b_4 produce the second compressed air by compressing air. For the compressors, conventional turbo compressor, rotational compressor, and reciprocating compressor may be used.

The first gear 621c is mounted on the rotational shaft 621a, and the second gear 621d is engaged with the first gear 621c. The first gear 621c and the second gear 621d have a form of a spur gear.

The rotational shaft 621a receives power from the power generating unit 623 and rotates the first gear 621c mounted on the rotational shaft 621a. When the first gear 621c rotates, the second gear 621d engaged therewith also rotates. When the second gear 621d rotates, the four compressors 621b_1, 621b_2, 621b_3, and 621b_4 connected with a shaft of the second gear 621d are driven by receiving power therefrom.

The sixth exemplary embodiment has a configuration in which the first gear 621c and the second gear 621d are engaged with each other and transfer the power of the rotational shaft 621a to the four compressors 621b_1, 621b_2, 621b_3, and 621b_4, but the exemplary embodiment is not limited thereto. That is, according to an exemplary embodiment, a configuration of a power transfer means of the relevant portion is not particularly limited. For example, besides the first gear 621c and the second gear 621d, a third gear, a fourth gear, etc. may be additionally configured, and the form of a gear may be a helical gear, a double helical gear, a bevel gear, etc. Also, a power transfer means such as a belt transmission, a chain transmission, and a frictional wheel transmission, not a gear transmission may be used.

The compressing unit 621 according to the sixth exemplary embodiment includes the four compressors 621b_1, 621b_2, 621b_3, and 621b_4, but an exemplary embodiment is not limited thereto. That is, a number of the compressors provided to a compressing portion according to an exemplary embodiment is not particularly limited. For example, the compressing portion may include one, two, three, five, six, and more compressors.

For the power generating unit 623, a motor, an engine, etc. may be used. For the motor, an alternating current motor, a direct current motor, a servo motor, etc. may be used. For the engine, a heat engine, an internal combustion engine, etc. may be used.

The second compressed air compressed by the compressing unit 621 is stored in the compressed air storage unit 622 by way of a duct line CF4, and when needed, the second compressed air is extracted, and then transferred to the heat recoverer 660.

Meanwhile, the compressing portion 630 produces first compressed air entering the combustor 640 by compressing air. For the compressing portion 630, conventional turbo compressor, rotational compressor, reciprocating compressor, etc. may be used.

The compressing portion 630 is driven by receiving power from the output shaft 611. That is, a driving shaft of the compressing portion 630 is integrally configured with the output shaft 611, and rotates by receiving power therefrom.

The compressing portion 630 includes multiple compressing stages. That is, the compressing portion 630 includes a first compressing stage 630a, a second compressing stage 630b, a third compressing stage 630c, and a fourth compressing stage 630d in the order ranging from a low pressure stage to a high pressure stage. According to the sixth exemplary embodiment, the compressing portion 630 includes the four-stage compressing stages, but an exemplary embodiment is not limited thereto. That is, a number of compressing stages of the compressing portion according to an exemplary embodiment is not particularly limited.

Meanwhile, the gas turbine system 600 includes cooling duct lines RF1, RF2, RF3, and RF4. One ends of the cooling duct lines RF1, RF2, RF3, and RF4 communicate with the fourth compressing stage 630d, the third compressing stage 630c, the second compressing stage 630b, and the first compressing stage 630a. Also, the other ends of the cooling duct lines RF1, RF2, RF3, and RF4 communicate with the first expansion stage 610a, the second expansion stage 610b, the third expansion stage 610c, and the fourth expansion stage 610d to assist cooling inside the expansion stages 610a, 610b, 610c, and 610d. That is, the cooling duct lines RF1, RF2, RF3, and RF4 cool down the turbine portion 610 by extracting a portion of compressed air from the fourth compressing stage 630d, the third compressing stage 630c, the second compressing stage 630b, and the first compressing stage 630a, and transferring the extracted compressed air to the corresponding expansion stages 610a, 610b, 610c, and 610d of the turbine portion 610.

Valves VF7, VF8, VF9, and VF10 are respectively installed to the cooling duct lines RF1, RF2, RF3, and RF4. The valves VF7, VF8, VF9, and VF10 may be configured as electronic valves to be opened/closed by receiving an instruction of the controller 670, or configured so that a user may manually open/close the valves.

Also, coolers SF1 and SF2 are respectively disposed to the cooling duct lines RF1 and RF2. The coolers SF1 and SF2 cool down air coming from the fourth compressing stage 630d and the third compressing stage 630c having relatively high temperature from among the compressing portion 630. Also, the cooling duct lines RF1, RF2, RF3, and RF4 are respectively connected with duct lines CF71, CF72, CF73, and CF74.

According to a sixth exemplary embodiment, the compressing portion 630 includes the four compressing stages 630a, 630b, 630c, and 630d, and the turbine portion 610 includes the four expansion stages 610a, 610b, 610c, and 610d, so that the four cooling duct lines RF1, RF2, RF3, and RF4 are respectively connected with the corresponding compressing stages and expansion stages, but an exemplary embodiment is not limited thereto. That is, a number of the compressing stages of the compressing portion may be different from a number of the expansion stages of the turbine portion. In this case, a connection structure of the cooling duct line may change. For example, in the case where a number of the compressing stages of the compressing portion is three and a number of the expansion stages of the turbine portion is four, three cooling duct lines may be configured, and one of the three cooling duct lines may be connected to two expansion stages. In this case, a pressure difference of expansion stages connected to a common cooling duct line may be small.

Meanwhile, the combustor 640 generates a gas of high temperature and high pressure by inputting fuel to the first compressed air coming from the compressing portion 630 via a duct line PF1 and generating a combustion operation. For the combustor 640, a known combustor generally used for a turbine apparatus may be used.

The generator 650 receives power from a shaft 612 connected with a shaft of the compressing portion 630 and performs electricity generation. According to the sixth exemplary embodiment, a driving shaft of the generator 650 is integrally configured with the shaft 612 and rotates by receiving power therefrom.

The gas turbine system 600 according to the sixth exemplary embodiment includes the generator 650, but the exemplary embodiment is not limited thereto. That is, the gas turbine system 600 according to the exemplary embodiment may be configured not to include the generator 650. In this case, the generated power may be used for driving other mechanical apparatuses, or immediately converted into thermal energy.

The heat recoverer 660 is a unit recovering a heat from a discharge gas of the turbine portion 610. A stack 661 to which the discharge gas is discharged is disposed in the rear portion. A heat exchanger 661a exchanging heat is disposed in the stack 661.

The heat recoverer 660 according to the sixth exemplary embodiment includes a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the heat recoverer 660, and facilities for discharging condensed water may be installed depending on the case. Since the heat recoverer 660 includes the heat recovery steam generator according to the sixth exemplary embodiment, steam is generated. When the steam is generated, the generated steam may be transferred to a steam turbine apparatus (not shown) afterward and used for secondary electricity generation.

The controller 670 includes an electric circuit, an integrated circuit chip, etc., and controls controlled portions by performing an operation according to a program operating the gas turbine system 600. Specific control operations thereof are described below.

Hereinafter, an operation of the gas turbine system 600 according to the sixth exemplary embodiment is described with reference to FIG. 6.

When a user inputs a [power generation command] to the controller 670 to generate electricity, the controller 670 drives the compressing portion 630 by using an initial start motor (not shown), etc. to generate the first compressed air, and then transfers the generated first compressed air to the combustor 640 via a duct line CF1.

The first compressed air transferred to the combustor 640 is combusted with fuel to generate a combustion gas, and the gas of high temperature and high pressure moves to the turbine portion 610 via a duct line CF2 and expands, thereby producing power.

When the turbine portion 610 produces power, the turbine portion 610 performs electricity generation by driving the generator 650 via the output shaft 611 and the shaft 612, and also allows the gas turbine system 600 to be driven continuously by driving the compressing portion 630 via the output shaft 611. Meanwhile, a discharge gas discharged from the turbine portion 610 moves to the heat recoverer 660 via a duct line CF3, so that heat is recovered, and then the discharge gas is discharged to outside. Here, the recovered heat of the discharged gas is used for a heat exchange operation at the heat exchanger 661a of the stack 661.

Meanwhile, the controller 670 drives the compressing unit 621 by driving the power generating unit 623 and controls to open a valve VF1 according to a program stored in advance or a user's instruction.

The second compressed air compressed by the compressing unit 621 is stored in the compressed air storage unit 622 by way of a duct line CF4. When needed, the controller 670 extracts the second compressed air from the compressed air storage unit 622 and transfers the extracted second compressed air to the heat recoverer 660 by way of a duct line CF5 by controlling a valve VF2.

The second compressed air transferred to the heat exchanger 661a via the duct line CF5 receives heat recovered from the discharge gas, and then flows through a duct line CF6, and moves to dividers DF1, DF2, and DF3. Here, each of the dividers DF1, DF2, and DF3 connected to the duct line CF6 may be configured by using a variable valve in which an opening degree may be adjusted by the controller 670. In this case, the controller 670 may adjust the dividers DF1, DF2, and DF3 to an opening degree that may implement a maximum performance according to an internal operating program.

When the controller 670 opens valves VF3, VF4, VF5, and VF6, the second compressed air flowing through the duct line CF6 passes through the duct lines CF72, CF71, CF73, and CF74, respectively, and then is transferred to the cooling duct lines RF2, RF1, RF3, and RF4.

Also, the controller 670 cools down the turbine portion 610 by opening the valves VF7, VF8, VF9, and VF10 and transferring compressed air extracted from the respective stages of the compressing portion 630 together with the second compressed air transferred to the cooling duct lines RF2, RF1, RF3, and RF4 to the respective expansion stages 610a, 610b, 610c, and 610d of the turbine portion 610.

When the turbine portion 610 is cooled down, overheating of the rotor (not shown), the blades (not shown), and the vanes (not shown) of the turbine portion 610 are prevented, so that the life of turbine portion 610 may extend.

In the case of the sixth exemplary embodiment, since the second compressed air flowing through the duct line CF6 together with compressed air extracted from the respective stages of the compressing portion 630 is used for cooling down the turbine portion 610, an amount of compressed air extracted from the compressing portion 630 to cool down the turbine portion 610 may be remarkably reduced, and thus the pressure of the compressing portion 630 is maintained relatively constant. By doing so, additional improvement of 5% to 20% in the output is possible on the whole within a limit of a stall of the compressing portion 630.

Also, according to the sixth exemplary embodiment, since the compressed air supplier 620 includes the compressed air storage unit 622, the compressed air supplier 620 may produce and store the second compressed air when electric power is cheap, and then extract and use the stored second compressed air when needed. By doing so, energy costs may be reduced.

FIG. 7 is a view illustrating a schematic configuration of a gas turbine system according to a seventh exemplary embodiment. Hereinafter, the seventh exemplary embodiment is described with reference to FIG. 7.

A gas turbine system 700 according to the seventh exemplary embodiment includes a turbine portion 710, a compressed air supplier 720, a compressing portion 730, a combustor 740, a generator 750, a heat recoverer 760, a controller 770, and a branching unit 780.

The turbine portion 710 includes a known rotor (not shown), blades (not shown), and vanes (not shown) therein. Also, the turbine portion 710 includes an output shaft 711, and the output shaft 711 is connected with a shaft of the rotor inside the turbine portion 710.

The turbine portion 710 includes a multi-stage structure having four expansion stages. That is, the turbine portion 710 includes a first expansion stage 710a, a second expansion stage 710b, a third expansion stage 710c, and a fourth expansion stage 710d in the order ranging from a high pressure stage to a low pressure stage.

According to the seventh exemplary embodiment, for description, the turbine portion 710 includes the structure having the four expansion stages, but the exemplary embodiment is not limited thereto. That is, according to the exemplary embodiment, a number of the expansion stages of the turbine portion 710 is not particularly limited. For example, a number of the expansion stages of the turbine portion 710 may be 1, 2, 3, 5, 10, etc.

Meanwhile, the compressed air supplier 720 includes a compressing unit 721, a compressed air storage unit 722, and a power generating unit 723.

The compressing unit 721 has a configuration of receiving power from the power generating unit 723 and producing second compressed air by compressing air. For the compressing unit 721, conventional turbo compressor, rotational compressor, and reciprocating compressor may be used.

The compressing unit 721 includes a rotational shaft 721a, four compressors 721b_1, 721b_2, 721b_3, and 721b_4, a first gear 721c, and a second gear 721d.

The rotational shaft 721a is connected to a shaft of the power generating unit 723.

The compressors 721b_1, 721b_2, 721b_3, and 721b_4 produce the second compressed air by compressing air. For the compressors, conventional turbo compressor, rotational compressor, and reciprocating compressor may be used.

The first gear 721c is mounted on the rotational shaft 721a, and the second gear 721d is engaged with the first gear 721c. The first gear 721c and the second gear 721d have a form of a spur gear.

The rotational shaft 721a receives power from the power generating unit 723 and rotates the first gear 721c mounted on the rotational shaft 721a. When the first gear 721c rotates, the second gear 721d engaged therewith also rotates. When the second gear 721d rotates, the four compressors 721b_1, 721b_2, 721b_3, and 721b_4 connected with a shaft of the second gear 721d are driven by receiving power therefrom.

The seventh exemplary embodiment has a configuration in which the first gear 721c and the second gear 721d are engaged with each other and transfer the power of the rotational shaft 721a to the four compressors 721b_1, 721b_2, 721b_3, and 721b_4, but the exemplary embodiment is not limited thereto. That is, according to an exemplary embodiment, a configuration of a power transfer means of the relevant portion is not particularly limited. For example, besides the first gear 721c and the second gear 721d, a third gear, a fourth gear, etc. may be additionally configured, and the form of a gear may be a helical gear, a double helical gear, a bevel gear, etc. Also, a power transfer means such as a belt transmission, a chain transmission, and a frictional wheel transmission, not a gear transmission may be used.

The compressing unit 721 according to the seventh exemplary embodiment includes the four compressors 721b_1, 721b_2, 721b_3, and 721b_4, but an exemplary embodiment is not limited thereto. That is, a number of the compressors provided to a compressing portion according to an exemplary embodiment is not particularly limited. For example, the compressing portion may include one, two, three, five, six, and more compressors.

For the power generating unit 723, a motor, an engine, etc. may be used. For the motor, an alternating current motor, a direct current motor, a servo motor, etc. may be used. For the engine, a heat engine, an internal combustion engine, etc. may be used.

The second compressed air compressed by the compressing unit 721 is stored in the compressed air storage unit 722 by way of a duct line CG4, and when needed, the second compressed air is extracted, and then transferred to the heat recoverer 760.

Meanwhile, the compressing portion 730 produces first compressed air entering the combustor 740 by compressing air. For the compressing portion 730, conventional turbo compressor, rotational compressor, reciprocating compressor, etc. may be used.

The compressing portion 730 is driven by receiving power from the output shaft 711. That is, a driving shaft of the compressing portion 730 is integrally configured with the output shaft 711, and rotates by receiving power therefrom. In the case of the seventh exemplary embodiment, the compressing portion 730 includes four-stage compressing stages, but an exemplary embodiment is not limited thereto. That is, a number of compressing stages of the compressing portion is not particularly limited.

The compressing portion 730 includes multiple compressing stages. That is, the compressing portion 730 includes a first compressing stage 730a, a second compressing stage 730b, a third compressing stage 730c, and a fourth compressing stage 730d in the order ranging from a low pressure stage to a high pressure stage.

Meanwhile, the gas turbine system 700 includes cooling duct lines RG1, RG2, RG3, and RG4. One ends of the cooling duct lines RG1, RG2, RG3, and RG4 communicate with the fourth compressing stage 730d, the third compressing stage 730c, the second compressing stage 730b, and the first compressing stage 730a. Also, the other ends of the cooling duct lines RG1, RG2, RG3, and RG4 communicate with the first expansion stage 710a, the second expansion stage 710b, the third expansion stage 710c, and the fourth expansion stage 710d to assist cooling inside the expansion stages 710a, 710b, 710c, and 710d. That is, the cooling duct lines RG1, RG2, RG3, and RG4 cool down the turbine portion 710 by extracting a portion of compressed air from the fourth compressing stage 730d, the third compressing stage 730c, the second compressing stage 730b, and the first compressing stage 730a, and transferring the extracted compressed air to the corresponding expansion stages 710a, 710b, 710c, and 710d of the turbine portion 710.

Valves VG7, VG8, VG9, and VG10 are respectively installed to the cooling duct lines RG1, RG2, RG3, and RG4. The valves VG7, VG8, VG9, and VG10 may be configured as electronic valves to be opened/closed by receiving an instruction of the controller 770, or configured so that a user may manually open/close the valves.

Also, coolers SG1 and SG2 are respectively disposed to the cooling duct lines RG1 and RG2. The coolers SG1 and SG2 cool down air coming from the fourth compressing stage 730d and the third compressing stage 730c having relatively high temperature from among the compressing portion 730. Also, the cooling duct lines RG1, RG2, RG3, and RG4 are respectively connected with duct lines CG81, CG82, CG83, and CG84.

According to the seventh exemplary embodiment, the compressing portion 730 includes the four compressing stages 730a, 730b, 730c, and 730d, and the turbine portion 710 includes the four expansion stages 710a, 710b, 710c, and 710d, so that the four cooling duct lines RG1, RG2, RG3, and RG4 are respectively connected with the corresponding compressing stages and expansion stages, but an exemplary embodiment is not limited thereto. That is, a number of the compressing stages of the compressing portion may be different from a number of the expansion stages of the turbine portion. In this case, a connection structure of the cooling duct line may change. For example, in the case where a number of the compressing stages of the compressing portion is three and a number of the expansion stages of the turbine portion is four, three cooling duct lines may be configured, and one of the three cooling duct lines may be connected to two expansion stages. In this case, a pressure difference of expansion stages connected to a common cooling duct line may be small.

Meanwhile, the combustor 740 generates a gas of high temperature and high pressure by inputting fuel to the first compressed air coming from the compressing portion 730 via a duct line PG1 and generating a combustion operation. For the combustor 740, a known combustor generally used for a turbine apparatus may be used.

The generator 750 receives power from a shaft 712 connected with a shaft of the compressing portion 730 and performs electricity generation. According to the seventh exemplary embodiment, a driving shaft of the generator 750 is integrally configured with the shaft 712 and rotates by receiving power therefrom.

The gas turbine system 700 according to the seventh exemplary embodiment includes the generator 750, but the exemplary embodiment is not limited thereto. That is, the gas turbine system 700 according to the exemplary embodiment may be configured not to include the generator 750. In this case, the generated power may be used for driving other mechanical apparatuses, or immediately converted into thermal energy.

The heat recoverer 760 is a unit recovering a heat from a discharge gas of the turbine portion 710. A stack 761 to which the discharge gas is discharged is disposed in the rear portion. A heat exchanger 761a exchanging heat is disposed in the stack 761.

The heat recoverer 760 according to the seventh exemplary embodiment includes a heat recovery steam generator (HRSG), but the exemplary embodiment is not limited thereto. That is, as long as the heat recoverer recovers heat from a discharge gas of the turbine portion, the configuration and type of the heat recoverer are not limited. For example, the heat recoverer according to the exemplary embodiment may have a configuration of transferring heat to fluid inside a heat exchanger by simply spraying a discharge gas to an external pin of the heat exchanger without generating steam.

A recuperator may be additionally installed to the heat recoverer 760, and facilities for discharging condensed water may be installed depending on the case. Since the heat recoverer 760 includes the heat recovery steam generator according to the seventh exemplary embodiment, steam is generated. When the steam is generated, the generated steam may be transferred to a steam turbine apparatus (not shown) afterward and used for secondary electricity generation.

The controller 770 includes an electric circuit, an integrated circuit chip, etc., and controls controlled portions by performing an operation according to a program operating the gas turbine system 700. Specific control operations thereof are described below.

Meanwhile, the branching unit 780 is connected to the duct line CG6, extracts at least a portion of the second compressed air transferred to the duct line CG6 and provides the extracted second compressed air to a duct line CG9, and transfers the rest of the compressed air left after the extraction to a duct line CG7.

The branching unit 780 may include an automatic variable branching valve that may adjust a branched amount under control of the controller 770. In this case, the controller 770 adjusts a branched amount of compressed air branching off to the duct lines CG7 and CG9 by adjusting the branching unit 780 according to an internal operating program set such that the gas turbine system 700 may implement an optimized performance.

According to the seventh exemplary embodiment, the branching unit 780 includes the automatic variable branching valve, but the exemplary embodiment is not limited thereto. That is, the branching unit according to an exemplary embodiment may include a variable branching valve that may manually adjust a branched amount, and may include a branching valve having a fixed ratio of a branched amount with respect to respective duct lines.

Hereinafter, an operation of the gas turbine system 700 according to the seventh exemplary embodiment is described with reference to FIG. 7.

When a user inputs a ⌈power generation command⌋ to the controller 770 to generate electricity, the controller 770 drives the compressing portion 730 by using an initial start motor (not shown), etc. to generate the first compressed air, and then transfers the generated first compressed air to the combustor 740 via a duct line CG1.

The first compressed air transferred to the combustor 740 is combusted with fuel to generate a combustion gas, and the gas of high temperature and high pressure moves to the turbine portion 710 via a duct line CG2 and expands, thereby producing power.

When the turbine portion 710 produces power, the turbine portion 710 performs electricity generation by driving the generator 750 via the output shaft 711 and the shaft 712, and also allows the gas turbine system 700 to be driven continuously by driving the compressing portion 730 via the output shaft 711. Meanwhile, a discharge gas discharged from the turbine portion 710 moves to the heat recoverer 760 via a duct line CG3, so that heat is recovered, and then the discharge gas is discharged to outside. Here, the recovered heat of the discharged gas is used for a heat exchange operation at the heat exchanger 761a of the stack 761.

Meanwhile, the controller 770 drives the compressing unit 721 by driving the power generating unit 723 and controls to open a valve VG1 according to a program stored in advance or a user's instruction.

The second compressed air compressed by the compressing unit 721 is stored in the compressed air storage unit 722 by way of a duct line CG4. When needed, the controller 770 extracts the second compressed air from the compressed air storage unit 722 and transfers the extracted second compressed air to the heat recoverer 760 by way of a duct line CG5 by controlling a valve VG2.

The second compressed air transferred to the heat exchanger 761a via the duct line CG5 receives heat recovered from the discharge gas, and then flows through a duct line CG6, and reaches the branching unit 780.

In the branching unit 780, the second compressed air that has flowed through the duct line CG6 branches off according to a dividing ratio of the compressed air determined by the controller 770, and is transferred to the duct lines CG7 and CG9, respectively.

The compressed air transferred by the branching unit 780 to the duct line CG7 moves to dividers DG1, DG2, and DG3. Here, each of the dividers DG1, DG2, and DG3 connected to the duct line CG7 may be configured by using a variable valve in which an opening degree may be adjusted by the controller 770. In this case, the controller 770 may adjust the dividers DG1, DG2, and DG3 to an opening degree that may implement a maximum performance according to an internal operating program.

When the controller 770 opens valves VG3, VG4, VG5, and VG6, the compressed air transferred to the duct line CG7 passes through the CG82, CG81, CG83, and CG84, and then is transferred to the cooling duct lines RG2, RG1, RG3, and RG4.

Also, the controller 770 cools down the turbine portion 710 by opening the valves VG7, VG8, VG9, and VG10 and transferring compressed air extracted from the respective stages of the compressing portion 730 together with the second compressed air transferred to the cooling duct lines RG2, RG1, RG3, and RG4 to the respective expansion stages 710a, 710b, 710c, and 710d of the turbine portion 710.

When the turbine portion 710 is cooled down, overheating of the rotor (not shown), the blades (not shown), and the vanes (not shown) of the turbine portion 710 are prevented, so that the life of turbine portion 710 may extend.

In the case of the seventh exemplary embodiment, since the second compressed air flowing through the duct line CG7 together with compressed air extracted from the respective stages of the compressing portion 730 is used for cooling down the turbine portion 710, an amount of compressed air extracted from the compressing portion 730 to cool down the turbine portion 710 may be remarkably reduced, and thus the pressure of the compressing portion 730 is maintained relatively constant. By doing so, additional improvement of 5% to 20% in the output is possible on the whole within a limit of a stall of the compressing portion 730.

Meanwhile, a portion of the second compressed air transferred from the branching unit 780 to the duct line CG9 is transferred to the combustor 740. When the heated second compressed air is transferred to the combustor 740, the output of the gas turbine system 700 improves. That is, during the daytime in the summer season where the peak of electric power frequently occurs, the output of composite thermal power reduces due to a rise of the atmospheric temperature, and in the case where the atmospheric temperature is about 30° C., improvement of about 20% in the output is possible by putting compressed air in the combustor 740.

Also, according to the seventh exemplary embodiment, since the compressed air supplier 720 includes the compressed air storage unit 722, the compressed air supplier 720 may produce and store the second compressed air when electric power is cheap, and then extract and use the stored second compressed air when needed. By doing so, energy costs may be reduced.

Though the inventive concept has been described with reference to exemplary embodiments illustrated in the accompanying drawings, these are provided for an exemplary purpose only, and one of ordinary skill in the art will understand that various modifications and other equivalent embodiments may be made therein. Therefore, the spirit and scope of the inventive concept should be defined by the following claims.

INDUSTRIAL APPLICABILITY

The gas turbine system according to the exemplary embodiment may be used for manufacturing or operating the gas turbine system.

The invention claimed is:

1. A gas turbine system comprising:
a compressing portion;
a combustor generating a combustion operation by using first compressed air coming from the compressing portion;
a turbine portion generating power by using a combustion gas coming from the combustor;
a heat recoverer recovering a heat from a discharge gas of the turbine portion;
a compressed air supplier providing second compressed air to which the heat recovered by the heat recoverer is transferred; and
a branching unit allowing the second compressed air that has received the heat from the heat recoverer to branch off to a first duct line connected to the combustor and a second duct line connected to the turbine portion,
wherein the compressing portion comprises a plurality of compressing stages, and the turbine portion comprises a plurality of expansion stages, and the plurality of compressing stages and the plurality of expansion stages are connected by using cooling duct lines, and the cooling duct lines are connected to respective connection duct lines,
wherein one end of the first duct line is directly connected to the branching unit, and the other end of the first duct line is directly connected to the combustor, and
wherein one end of the second duct line is directly connected to the branching unit, and the second duct line is directly connected to the respective connection duct lines, and
wherein at least a portion of the second compressed air to which the heat has been transferred is supplied to at least one of the combustor or the turbine portion.

2. The gas turbine system of claim 1, wherein the second compressed air to which the heat has been transferred is transferred to at least a portion of the plurality of expansion stages.

3. The gas turbine system of claim 1, wherein valves are respectively installed to the connection duct lines.

4. The gas turbine system of claim 1, wherein the heat recoverer comprises a stack to which the discharge gas is discharged, and a heat exchanger exchanging heat with the second compressed air is disposed on the stack.

5. The gas turbine system of claim 1, wherein the heat recoverer comprises a heat recovery steam generator.

6. The gas turbine system of claim 5, comprising:
a regenerative heat exchanger transferring heat to the second compressed air by using steam generated by the heat recovery steam generator.

7. The gas turbine system of claim 1, wherein the compressed air supplier is driven by using power generated by the turbine portion.

8. The gas turbine system of claim 7, further comprising:
a clutch controlling transfer of power which is generated by the turbine portion and transferred to the compressed air supplier.

9. The gas turbine system of claim 1, wherein the compressed air supplier is driven by power generated by a power generating unit.

10. The gas turbine system of claim 1, wherein the compressed air supplier comprises a plurality of compressors.

11. The gas turbine system of claim 1, wherein the compressed air supplier comprises a compressed air storage unit in which the second compressed air is stored.

12. The gas turbine system of claim 1, comprising:
a generator performing electricity generation by using power generated by the turbine portion.

13. The gas turbine system of claim 1, wherein the compressing portion, the combustor, the turbine portion, and the heat recoverer are disposed in plural.

14. A gas turbine system comprising:
a compressing portion;
a combustor generating a combustion operation by using first compressed air coming from the compressing portion;
a turbine portion generating power by using a combustion gas coming from the combustor;
a heat recoverer recovering a heat from a discharge gas of the turbine portion and comprising a heat recovery steam generator;

a compressed air supplier providing second compressed air to which the heat recovered by the heat recoverer is transferred; and a branching unit allowing the second compressed air that has received the heat from the heat recoverer to branch off to a first duct line connected to the combustor and a second duct line connected to the turbine portion, wherein the compressing portion comprises a plurality of compressing stages, and the turbine portion comprises a plurality of expansion stages, and the plurality of compressing stages and the plurality of expansion stages are connected by using cooling duct lines, and the cooling duct lines are connected to respective connection duct lines, wherein one end of the first duct line is directly connected to the branching unit, and the other end of the first duct line is directly connected to the combustor, and wherein one end of the second duct line is directly connected to the branching unit, and the second duct line is directly connected to the respective connection duct lines, and wherein at least a portion of the second compressed air to which the heat has been transferred is supplied to the combustor.

15. A gas turbine system comprising:

a compressing portion;

a combustor generating a combustion operation by using first compressed air coming from the compressing portion;

a turbine portion generating power by using a combustion gas coming from the combustor;

a heat recoverer recovering a heat from a discharge gas of the turbine portion and comprising a heat recovery steam generator;

a compressed air supplier providing second compressed air to which the heat recovered by the heat recoverer is transferred; and a branching unit allowing the second compressed air that has received the heat from the heat recoverer to branch off to a first duct line connected to the combustor and a second duct line connected to the turbine portion, wherein the compressing portion comprises a plurality of compressing stages, and the turbine portion comprises a plurality of expansion stages, and the plurality of compressing stages and the plurality of expansion stages are connected by using cooling duct lines, and the cooling duct lines are connected to respective connection duct lines, wherein one end of the first duct line is directly connected to the branching unit, and the other end of the first duct line is directly connected to the combustor, and wherein one end of the second duct line is directly connected to the branching unit, and the second duct line is directly connected to the respective connection duct lines, and wherein at least a portion of the second compressed air to which the heat has been transferred is supplied to the turbine portion.

* * * * *